March 12, 1963 H. E. ESTY 3,081,114
ANCHORING DEVICE FOR PIPE AND THE LIKE
Filed Oct. 30, 1961 3 Sheets-Sheet 1
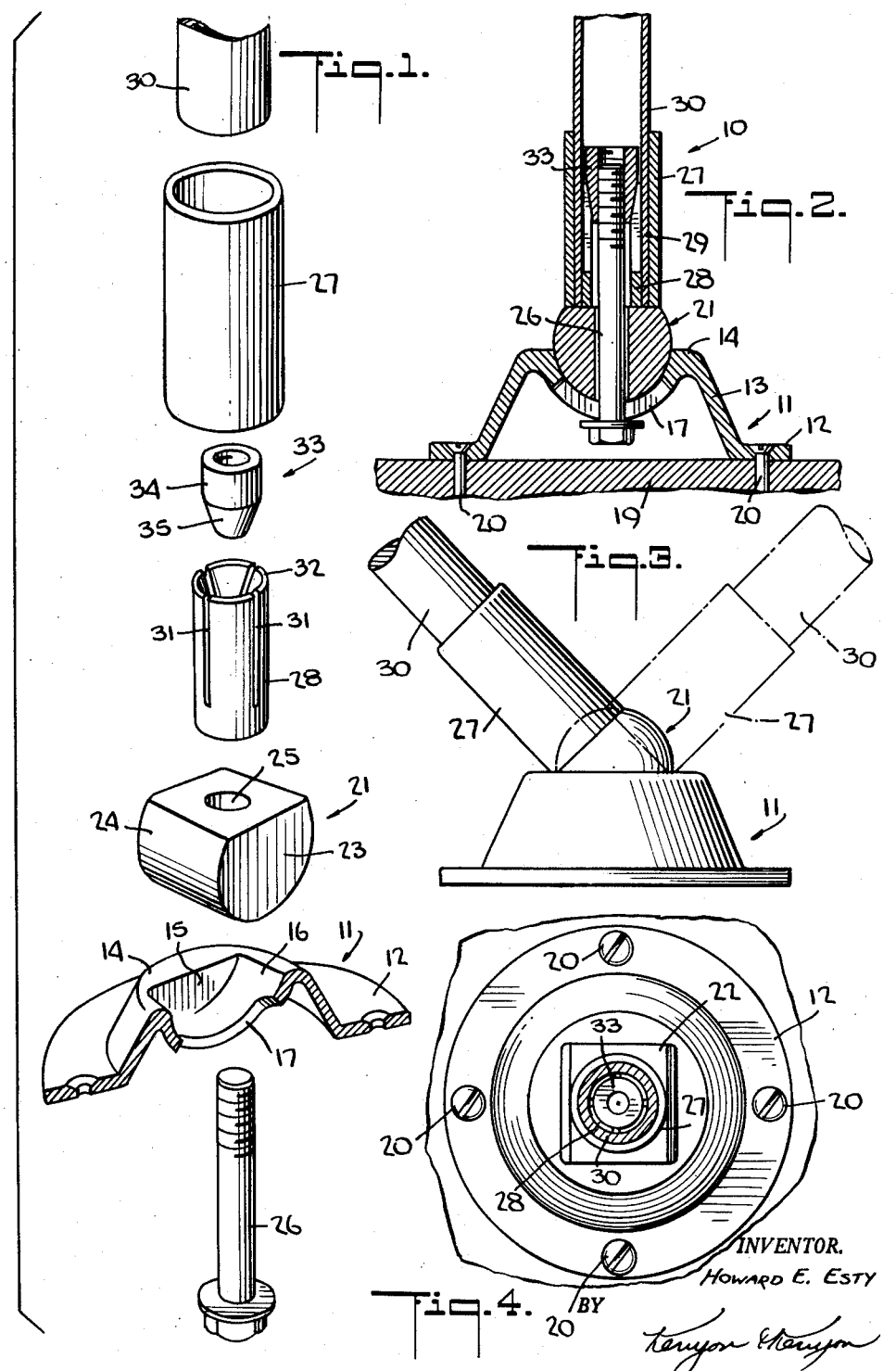
INVENTOR.
HOWARD E. ESTY
BY
ATTORNEYS March 12, 1963  H. E. ESTY  3,081,114
ANCHORING DEVICE FOR PIPE AND THE LIKE
Filed Oct. 30, 1961  3 Sheets-Sheet 2
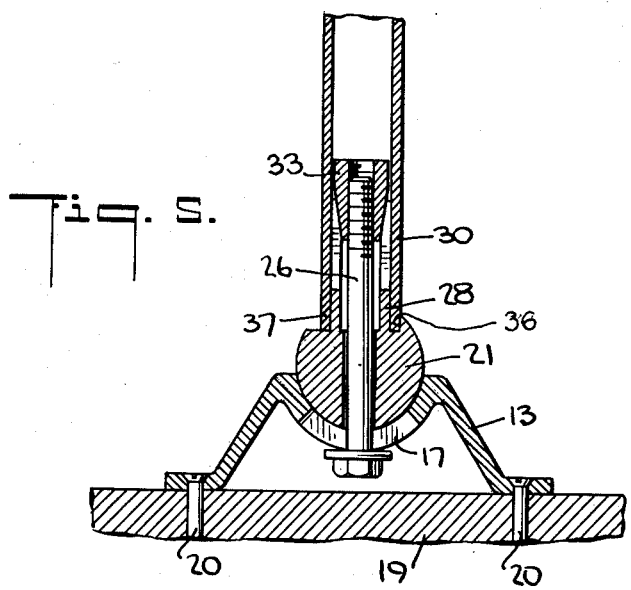
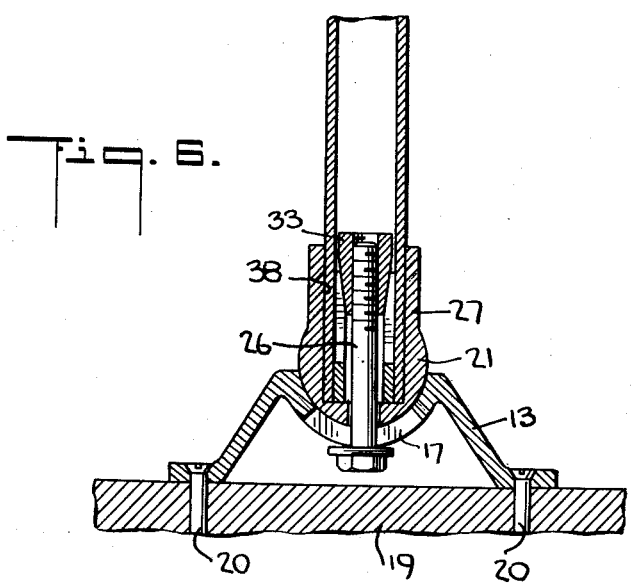
INVENTOR.
HOWARD E. ESTY
BY
ATTORNEYS March 12, 1963 H. E. ESTY 3,081,114
ANCHORING DEVICE FOR PIPE AND THE LIKE
Filed Oct. 30, 1961 3 Sheets-Sheet 3
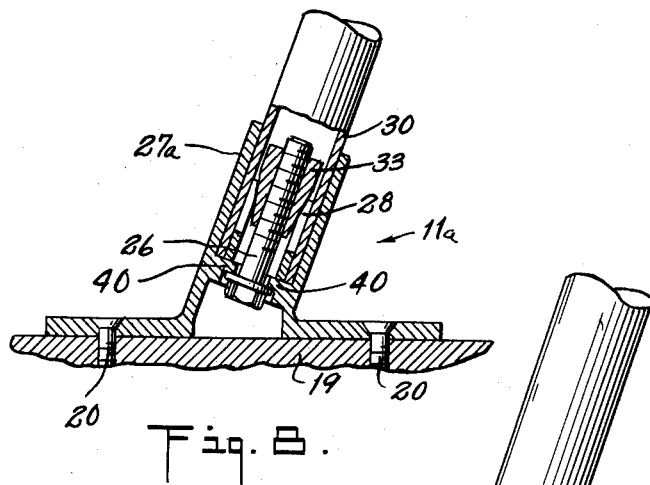
Fig. 8.
Fig. 7.
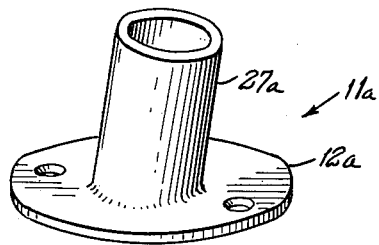
Fig. 9.
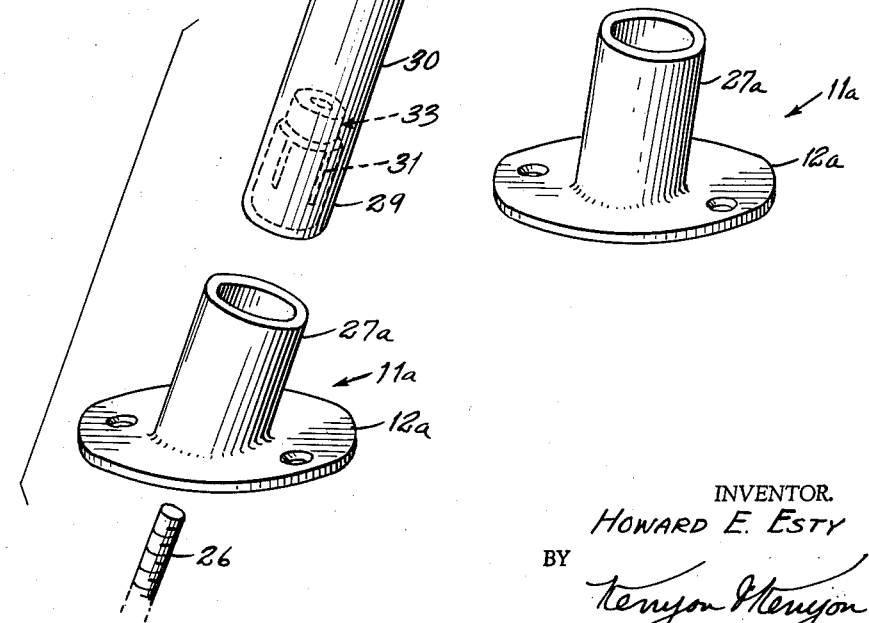
INVENTOR.
HOWARD E. ESTY
BY
ATTORNEYS United States Patent Office 3,081,114
Patented Mar. 12, 1963

3,081,114
ANCHORING DEVICE FOR PIPE AND THE LIKE
Howard E. Esty, 67 Lynde St., Old Saybrook, Conn.
Filed Oct. 30, 1961, Ser. No. 148,624
18 Claims. (Cl. 287—12)

This invention relates to a device particularly adapted for use on marine craft to anchor the vertical support members of hand rails and the like to the boat deck.

It is an object of the invention to provide a pipe anchoring device which permanently affixes a pipe or the like in a desired angular relation to a supporting surface.

Another object is to provide a pipe anchoring device which is of simple construction and may be installed without the need of special skills or tools.

Briefly, a pipe is inserted into the cylindrical outer sleeve of a base member that is screwed or bolted to a deck or other supporting surface. By means of this invention, the pipe is held in this sleeve and to the base by an expansion fitting that comprises an inner sleeve, with a tapered inner portion and a plurality of longitudinal slots in its upper end, which is located inside the pipe end; a tapered nut, which is tapered to fit in the tapered upper end of the inner sleeve; and a bolt, which is placed through the base from its underside and through the inner sleeve to threadably engage the tapered nut. With the pipe in place, the bolt is tightened to draw the tapered nut into the inner sleeve, which is forced outward to swage the pipe end between the inner sleeve and the outer sleeve thereby securing it to the base, and the supporting surface.

In a first embodiment of the invention, the outer sleeve is joined to the base by means which permit it to be rotated about one axis with respect to the base and supporting surface. In this embodiment, the base member has a boss thereon with a recess in the top defined by a pair of opposed flat semicircular sides and an interconnecting bottom having a longitudinally disposed slotted portion therein communicating with the underside of said base member. A complementary shaped fitting is rotatably disposed in the recess and the outer sleeve is affixed to it. A cylindrical bore, for the bolt, extends through the fitting from the bottom thereof and axially aligned with the said outer sleeve.

The fitting, and thereby the outer sleeve, may be pivoted in the recess about a single axis to place the top surface of the fitting at a desired angle relative to the supporting surface.

In a second embodiment, the outer sleeve is affixed directly to the base at some preselected angle. Standardized anchors may be supplied with the outer sleeves affixed to the bases at a number of different angles and an appropriate anchor selected to fasten a pipe to a supporting surface at a desired angle.

A shoulder inside the outer sleeve of this second embodiment provides an upper surface supporting the pipe and an under surface for the bolt to draw against.

The expansion fitting is the same for both these embodiments, and in both the cylindrical inner sleeve is concentrically disposed within the outer sleeve. It rests on the top surface of either the rotatable fitting or the shoulder. The bolt extends from the underside of the base and draws either directly against the base, adjacent the slotted portion through which it passes, or against the shoulder.

Other objects and features of the invention will become apparent from the following description and claims, and from the drawings in which:

FIG. 1 is an exploded view showing the assembly relationship of the various parts of a first embodiment of this invention;

FIG. 2 is a vertical section of this embodiment;

FIG. 3 is a diagrammatic elevation showing the angular adjustability of the fitting and outer sleeve with respect to the base member;

FIG. 4 is a plan view of the embodiment shown in FIG. 2;

FIG. 5 is a sectioned elevation of another form of the invention;

FIG. 6 is a sectioned elevation of another form of the invention;

FIG. 7 is an exploded view showing the assembly relationship of various parts of a second embodiment of this invention;

FIG. 8 is a vertical section of this second embodiment; and

FIG. 9 is a perspective drawing of this embodiment.

A first embodiment of an anchoring device constructed in accordance with the principles of the invention is shown in FIG. 2 and designated generally by reference numeral 10. Circular base member 11 has a flat peripheral flange portion 12 and a raised central portion or boss 13 which has a recessed top 14. The recess has a pair of flat opposed semicircular vertical sides 15 (see FIG. 1, only one shown) and an interconnecting bottom 16 having a longitudinally disposed slot 17 therein communicating with an underside 18 of the base member. The base member 11 is adapted for being secured to a supporting surface 19 by means of screw 20 or the like.

Fitting 21 has a bottom portion shaped complementary to the recessed portion of top 14. It has a flat rectangular top 22, a pair of opposed flat semicircular sides 23 (one shown) and an interconnecting curved bottom 24. Fitting 21 is disposed in the recessed top 14 and is pivotal therein about the single axis perpendicular to the sides 23 to provide adjustability of the top surface 22 of the fitting 21 and of the sleeves which are disposed thereon with respect to the supporting surface 19. Fitting 21 has a cylindrical bore 25 which extends through it in a generally perpendicular relation with the top 22 and which is axially aligned with the slot 17. The bore 25 is adapted to slidably receive bolt 26.

Outer cylindrical sleeve 27 and inner cylindrical sleeve 28 are concentrically disposed on the top surface 22 of the fitting 21 in axial alignment with the bore 25 and receive end portion 29 of pipe or tube 30 between them. Outer sleeve 27 is affixed to fitting 21 by any suitable means such as brazing or the like, or may be integrally formed therewith. Inner sleeve 28 has a plurality of longitudinal slots 31 therein extending entirely through the thickness of the sleeve and extending from an intermediate axial point through the length thereof and open at the upper end 32 as viewed in FIG. 1. Tapered nut 33 has a cylindrical body portion 34 of greater diameter than the inner diameter of inner sleeve 28 and a tapered bottom portion 35 which is dimensioned to fit against the taper of the inner sleeve 28 and be partially received by it.

The pipe anchor is assembled, as shown in FIG. 2, with the bolt extending through the slotted portion 17 of the base member 11, through the bore 25 of the fitting 21, and threadably engaging the tapered nut 33. Prior to final tightening of the bolt, the pipe 30 may be placed at any angular position with respect to the supporting surface 19 through a wide arc as shown in FIG. 3. Upon selection of the desired angle, bolt 26 is tightened or threaded into tapered nut 33 thereby causing the nut to move farther into the upper end of the inner sleeve 28 as the bolt head bears and draws against the under surface of the base member at its limit of upward axial movement. The resultant downward urging of the inner sleeve holds the rotatable fitting in the preselected angular position and the resultant expansion of the inner sleeve radially outward compresses and swages the pipe end 29 between the outer and inner sleeves 27, 28. This outward radial swaging force can be increased as desired for any given tension in the bolt by making the taper of the inner sleeve, and the matching taper of the nut, more nearly parallel to the axis of the sleeves. By such adjustment a swaging force appropriate to the strength of the outer sleeve and other parts, can be achieved, and the pipe 30 can be securely fixed in the selected angular orientation.

Alternate forms are shown in FIGS. 5 and 6 for the fitting 21; they could also be incorporated in the outer sleeve and base member of the second embodiment that is described below. The extreme lower end of the pipe, tube, stanchion or leg 30 must be held in axial alignment with the sleeves 27 and 28 either from the inside or outside, or both. FIG. 5 shows the tube end 30 held only on the inside by an inner sleeve 28 which may be a separate element, or affixed to or integrally formed with the fitting 21. The fitting 21 can alternatively have a recess or groove 36 in its upper surface to receive the extreme end 37 of the tube 30, as shown in the right half of FIG. 5, or such grove can be eliminated, as shown in the left half of FIG. 5. FIG. 6 shows another form of fitting 21 in which the outer sleeve 27 is integrally formed with the fitting and has an inner bore 38 which extends well into the fitting as shown. These and possibly even other modified arrangements of parts may be employed.

This first embodiment is also the subject of the inventor's application S.N. 23,456 filed April 20, 1960, now abandoned.

A second embodiment of this invention is shown in FIGS. 7, 8 and 9. An outer sleeve 27a is either formed with the base flange 12a, or brazed, welded or otherwise fastened to it at a preselected angle. Although this angle cannot be changed, some adjustment can be obtained by rotating the base member about the pipe, which may be secured from rotation because of its attachment to a handrail or for some other reason, thus setting the preselected angle between the pipe and the deck at the most desirable orientation to the deck, which may cambered.

The outer sleeve 27a carries a shoulder 40, inside and perpendicular to the sleeve, which supports the end of pipe 30 on an upper surface, and provides a bearing surface for the head of bolt 26 on the under side.

It is apparent from the above description that a permanent tight anchoring of pipes and the like can be achieved in a simple manner and without the need of special skills or tools. No special preparation of the pipe is needed and, as the expansion fitting can be preassembled in the anchor, pipe can be secured to the deck with a minimum labor cost.

The pipe may be conveniently removed and reanchored as often as may become desirable, without damage to the pipe or the anchor itself.

This device is particularly useful in mounting rail units on both large and small marine craft because it permits a good looking and uncomplicated installation regardless of deck camber or sheer.

The materials of construction can be of any suitable type. One which has been found to be worthwhile is cast aluminum but stainless steel, brass and other metals can likewise be used.

While certain embodiments of the invention have been shown and described it is to be understood that certain changes and additions may be made by those skilled in the art without departing from the scope and spirit of the invention.

What is claimed is:

1. An anchoring device for a pipe and the like comprising a base member adapted for being secured to a supporting surface, said base having a recess with a longitudinally disposed slot therein communicating with the underside of the base, a complementary shaped fitting rotatably disposed in said recess, said fitting having a bore extending therethrough in alignment with said slot, a sleeve disposed on said fitting in axial alignment with said bore and adapted to be received by a pipe end, said sleeve having at least one longitudinal slot therein extending through the sleeve and a tapered inner portion at the upper end thereof, a tapered nut, said nut dimensioned to fit against the tapered portion of said sleeve and to be partially received therein, a bolt extending upwardly through the slot in said base and said inner sleeve and rotatable therein, the under surface of said base engaging the head of said bolt to restrain it from upward axial movement past said under surface, said bolt threadably engaging said nut and said sleeve expandable radially outward so that, in response to tightening said bolt into said nut, said sleeve is urged downward to hold said fitting in a selected angular position within said recess and so that said sleeve is expanded radially outward to bear against the inner surface of a pipe to securely fix said pipe in respect to said base, and said supporting surface.

2. An anchoring device comprising a base adapted for being secured to a supporting surface, an outer sleeve, means for supporting said outer sleeve on said base, a slotted inner sleeve concentrically disposed inside said outer sleeve, said outer and inner sleeves adapted to receive a pipe end portion between them, said inner sleeve having a tapered portion in the upper end thereof, a tapered nut, said nut dimensioned to fit against the tapered portion of the inner sleeve and be partially received therein, a bearing surface portion fixed with respect to said base, a bolt extending upwardly through said bearing surface and said inner sleeve and rotatable therein, said bearing surface engaging the head of said bolt to restrain it from upward axial movement past said bearing surface, said bolt threadably engaging said nut and said inner sleeve expandable radially outward so that, in response to tightening said bolt into said nut, said inner sleeve is expanded radially outward to bear against the inner surface of a pipe to swage the pipe end between said inner and outer sleeves and securely fix it with respect to said base, and said supporting surface.

3. An anchoring device comprising a base adapted for being secured to a supporting surface, a cylindrical outer sleeve, means for supporting said outer sleeve on said base, a cylindrical inner sleeve having a plurality of longitudinal slots extending entirely through the thickness of the sleeve and from an intermediate point along the length thereof to the upper end thereof, said inner sleeve concentrically disposed inside said outer sleeve, said outer and inner sleeves adapted to receive a pipe end portion between them, said inner sleeve having a tapered portion in the upper end thereof, a tapered nut, said nut dimensioned to fit against the tapered portion of the inner sleeve and to be partially received therein, a bearing surface portion fixed with respect to said base, a bolt extending upwardly through said surface and said inner sleeve and rotatable therein, said bearing surface engaging the head of said bolt to restrain it from upward axial movement past said bearing surface, said bolt threadably engaging said nut and said inner sleeve expandable radially outward so that, in response to tightening said bolt into said nut, said inner sleeve is expanded radially outward to bear against the inner surface of a pipe to swage the pipe end between said inner and outer sleeves and securely fix it with respect to said base, and said supporting surface.

4. An anchoring device comprising a base adapted for being secured to a supporting surface, a cylindrical outer sleeve, a cylindrical inner sleeve, means for rotatably supporting said sleeves on said base, said inner sleeve having at least one slot extending therethrough and open at the upper end thereof, said inner sleeve concentrically disposed inside said outer sleeve, said outer and inner sleeves adapted to receive the end of a pipe between them, said inner sleeve having a tapered portion in the upper end thereof, a tapered nut, said nut dimensioned to fit against the tapered portion of the inner sleeve and to be partially received therein, a bolt extending upwardly through the base and said inner sleeve and rotatable therein, the under surface of said base engaging the head of said bolt to restrain it from upward axial movement past said under surface, said bolt threadably engaging said nut and said inner sleeve expandable radially outward so that, in response to tightening said bolt into said nut, said sleeves are held in a selected angular position with respect to said base and said inner sleeve is expanded radially outward to bear against the inner surface of a pipe to swage the pipe end between said inner and outer sleeves and securely fix said pipe in respect to said base, and said supporting surface.

5. An anchoring device comprising a base adapted for being secured to a supporting surface, a cylindrical outer sleeve, means for rotatably supporting said outer sleeve on said base including a recess in the top of said base having a longitudinally disposed slotted portion therein communicating with the underside of said base, a complementary shaped fitting rotatably disposed in said recess, said outer sleeve rigidly fixed to said fitting, a bore extending through said fitting axially aligned with said slotted portion and said outer sleeve, a cylindrical inner sleeve, with at least one longitudinal slot extending through the said inner sleeve and open at the upper end thereof, said inner sleeve concentrically disposed to said outer sleeve, said inner and outer sleeves adapted to receive a pipe end portion between them, a tapered portion in the upper end of said inner sleeve, a tapered nut, said nut dimensioned to fit against the tapered portion of the inner sleeve and to be partially received therein, a bolt extending upwardly through said slotted portion, said bore and said inner sleeve and rotatable therein, the under surface of the base adjacent said slotted portion engaging the head of said bolt to restrain it from upward axial movement past said under surface, said bolt threadably engaging said nut and said inner sleeve expandable radially outward so that, in response to tightening said bolt into said nut, said inner sleeve is urged downward to hold said fitting in a selected angular position and said sleeve is expanded radially outward to swage the pipe between the inner and outer sleeves and securely fix the pipe with respect to the base, and said supporting surface.

6. An anchoring device comprising a base adapted for being secured to a supporting surface, a cylindrical outer sleeve, means for rotatably supporting said outer sleeve on said base including a recess in the top of said base defined by a pair of opposed flat semicircular sides and an interconnecting bottom having a longitudinally disposed slotted portion therein communicating with the underside of said base, a complementary shaped fitting rotatably disposed in said recess, said outer sleeve rigidly fixed to said fitting, a bore extending through said fitting axially aligned with said slotted portion and said outer sleeve, a cylindrical inner sleeve, said inner sleeve having a plurality of longitudinal slots extending entirely through the thickness of the inner sleeve and from an intermediate point along the length thereof to the upper end thereof, said inner sleeve concentrically disposed to said outer sleeve and said inner and outer sleeves adapted to receive a pipe end portion between them, a tapered portion in the upper end of said inner sleeve, a tapered nut, said nut dimensioned to fit against the tapered portion of the inner sleeve and to be partially received therein, a bolt extending upwardly through said slotted portion, said bore and said inner sleeve and rotatable therein, the under surface of the base adjacent said slotted portion engaging the head of said bolt to restrain it from upward axial movement past said under surface, said bolt threadably engaging said nut and said inner sleeve expandable radially outward so that, in response to tightening said bolt into said nut, said inner sleeve is urged downward to hold said fitting in a selected angular position and said sleeve is expanded radially outward to swage the pipe between the inner and outer sleeves and securely fix the pipe with respect to the base, and said supporting surface.

7. An anchoring device comprising a base adapted to be secured to a supporting surface, an outer sleeve rigidly affixed to said base at a preselected angular relation, a shoulder affixed inside said outer sleeve and generally perpendicular to the axis thereof, an inner sleeve having at least one longitudinal slot extending through said sleeve and open at the upper end thereof, said inner sleeve disposed concentrically to said outer sleeve and above said shoulder, said outer and inner sleeves adapted to receive a pipe end portion between them, said inner sleeve having a tapered portion in the upper end thereof, a tapered nut, said nut dimensioned to fit against the tapered portion of the inner sleeve and to be partially received therein, a bolt extending upwardly through said shoulder and said inner sleeve and rotatable therein, the under surface of said shoulder engaging the head of said bolt to restrain it from upward axial movement past said under surface, said bolt threadably engaging said nut and said inner sleeve expandable radially outward so that, in response to tightening said bolt into said nut, said inner sleeve is expanded radially outward to swage the pipe end between said inner and outer sleeves to securely fix the pipe with respect to the base, and said supporting surface.

8. An anchoring device comprising a base adapted to be secured to a supporting surface, a cylindrical outer sleeve rigidly affixed to said base at a preselected angular relation, a shoulder affixed inside said outer sleeve and generally perpendicular to the axis thereof, a cylindrical inner sleeve having a plurality of longitudinal slots therein extending entirely through the thickness of the sleeve and from an intermediate point along the length thereof to the upper end thereof, said inner sleeve concentrically disposed to said outer sleeve and above said shoulder, said outer and inner sleeves adapted to receive a pipe end portion between them, said inner sleeve having a tapered portion in the upper end thereof, a tapered nut, said nut dimensioned to fit against the tapered portion of the inner sleeve and to be partially received therein, a bolt extending upwardly through said shoulder and said inner sleeve and rotatable therein, the under surface of said shoulder engaging the head of said bolt to restrain it from upward axial movement past said under surface, said bolt threadably engaging said nut and said inner sleeve expandable radially outward so that, in response to tightening said bolt into said nut, said inner sleeve is expanded radially outward to swage the pipe end between said inner and outer sleeves to securely fix the pipe with respect to the base, and said supporting surface.

9. In combination in an anchoring device, a base adapted to be secured to a supporting surface and an expansion fitting adapted to secure pipe and the like to said base including a sleeve expandable radially outward and having at least one longitudinal slot extending therethrough and a tapered portion in the upper end thereof, a tapered nut, said nut dimensioned to fit against the tapered portion of said sleeve and to be partially received therein, a bearing surface portion, a bolt extending upwardly through said bearing surface and said sleeve and rotatable therein, said bearing surface engaging the head of said bolt to restrain it from upward axial movement past said bearing surface, said bolt threadably engaging said nut so that, in response to tightening said bolt into said nut, said sleeve is expanded outwardly and bears against the inner surface of a pipe end to securely hold it with respect to said base, and said supporting surface.

10. An anchoring device for pipe and the like comprising a base member adapted for being secured to a supporting surface, said member having a recess in the top thereof with an opening in said recess extending through said member, a complementary shaped fitting rotatably disposed in said recess, said fitting having a bore extending therethrough in alignment with said opening, an inner sleeve disposed on said fitting in axial alignment with said bore and adapted to be received by a pipe end portion, said inner sleeve having at least one slot therein and a tapered portion in the upper end thereof and expansible means disposed in said inner sleeve and operable through said opening and said bore comprising a tapered nut, said nut dimensioned to fit against the tapered portion of said sleeve and to be partially received therein, a bolt extending upwardly and rotatably through said sleeve, said bolt threadably engaging said nut, said fitting pivotal in said recess to a preselected angle relative to said base, said inner sleeve expansible radially outwardly in response to actuation of said expansible means to securely grip said pipe end portion and fix said pipe with respect to said base, and a supporting surface.

11. An anchoring device for pipe and the like comprising a base member adapted for being secured to a supporting surface, said member having a recess in the top thereof and having an opening in said recess communicating with the underside of said member, a complementary shaped fitting rotatably disposed in said recess, said fitting having a bore extending therethrough in alignment with said opening, an outer sleeve and an inner sleeve concentrically disposed on said fitting in axial alignment with said bore and adapted to receive a pipe end portion between them, said outer sleeve affixed to said fitting, said inner sleeve having at least one slot therein, and expansible means disposed in said inner sleeve and operable through said opening and said bore, said fitting pivotal in said recess to a preselected angle of its top surface relative to said base, said inner sleeve expansible radially outwardly in response to actuation of said expansible means to securely grip said pipe end portion between said sleeves and fix said pipe with respect to said base, and a supporting surface.

12. An anchoring device for pipe and the like comprising a base member adapted for being secured to a supporting surface, a raised portion on said member having a recess in the top thereof and having a slotted portion in said recess communicating with the underside of said member, a complementary shaped fitting rotatably disposed in said recess, said fitting having a top surface and a bore extending therethrough in alignment with said slotted portion, an outer sleeve and an inner sleeve concentrically disposed on said top surface in axial alignment with said bore and adapted to receive a pipe end portion between them, said outer sleeve affixed to said fitting, said inner sleeve having at least one longitudinal slot therein opening at one end thereof, and expansible means disposed in said inner sleeve and operable through said slotted portion and said bore comprising a tapered nut dimensioned to fit against a tapered portion of said inner sleeve and to be partially received therein and a bolt extending upwardly and rotatably through said slotted portion, said bore and said inner sleeve, said bolt threadably engaging said nut, said fitting pivotal in said recess to a preselected angle of said top surface relative to said base, said inner sleeve expansible radially outwardly in response to actuation of said expansible means to securely grip said pipe end portion between said sleeves and fix said pipe with respect to said base, and a supporting surface.

13. An anchoring device for pipe and the like comprising a base member adapted for being secured to a supporting surface, a boss on said member having a recess in the top thereof and having a slotted portion in said recess communicating with the underside of said member, a complementary shaped fitting rotatably disposed in said recess, said fitting having a flat top surface and a bore extending therethrough in alignment with said slotted portion, an outer sleeve and an inner sleeve concentrically disposed on said top surface in axial alignment with said bore and adapted to receive a pipe end portion between them, said outer sleeve affixed to said fitting, said inner sleeve having at least one longitudinal slot therein opening at one end thereof, a tapered nut disposed in said inner sleeve, and a bolt extending through said slotted portion and said bore and threadably engaging said nut, said fitting pivotal in said recess to a preselected angle of said top surface relative to said base, said inner sleeve expansible radially upwardly in response to tightening movement of said nut to securely grip said pipe end portion between said sleeves and fix said pipe with respect to said base, and a supporting surface.

14. An anchoring device for pipe and the like comprising a base member adapted for being secured to a supporting surface, a boss on said member having a recess on the top thereof and having a slotted portion in said recess communicating with the underside of said member, a complementary shaped fitting rotatably disposed in said recess, said fitting having a flat top surface and a bore extending therethrough in alignment with said slotted portion, an outer sleeve and an inner sleeve concentrically disposed on said top surface in axial alignment with said bore and adapted to receive a pipe end portion between them, said outer sleeve affixed to said fitting, said inner sleeve having a plurality of longitudinal slots therein at the upper end thereof, a tapered nut disposed in the latter end of said inner sleeve, and a bolt extending through said slotted portion and said bore and threadably engaging said nut, said fitting pivotal in said recess about a single axis to a preselected angle of said top surface relative to said base, said inner sleeve expansible radially outwardly in response to tightening movement of said nut to securely grip said pipe end portion between said sleeve and fix said pipe with respect to said bore, and a supporting surface.

15. An anchoring device for pipe and the like comprising a base member adapted for being secured to a supporting surface, a boss on said member having a recess in the top thereof defined by a pair of opposed flat semicircular sides and an interconnecting bottom having a slotted portion therein communicating with the underside of said member, a complementary shaped fitting rotatably disposed in said recess, said fitting having a flat top surface and a bore extending therethrough in alignment with said slotted portion, an outer sleeve and an inner sleeve concentrically disposed on said top surface in axial alignment with said bore and adapted to receive a pipe end portion between them, said outer sleeve affixed to said fitting, said inner sleeve having a plurality of longitudinal slots therein at the upper end thereof, a tapered nut disposed in the latter end of said inner sleeve, and a bolt extending through said slotted portion and said bore and threadably engaging said nut, said fitting pivotal in said recess about a single axis to a preselected angle of said top surface relative to said base, said inner sleeve expansible radially outwardly in response to tightening movement of said nut to securely grip said pipe end portion between said sleeves and fix said pipe with respect to said base, and a supporting surface.

16. An anchoring device for pipe and the like comprising a base member adapted for being secured to a supporting surface, a boss on said member having a recess in the top thereof defined by a pair of opposed flat semicircular sides and an interconnecting bottom having a longitudinally disposed slotted portion therein communicating with the underside of said member, a complementary shaped fitting rotatably disposed in said recess, said fitting having a top surface and a cylindrical bore extending therethrough in alignment with said slotted portion, an outer cylindrical sleeve and an inner cylindrical sleeve concentrically disposed on said top surface in axial alignment with said bore and adapted to receive a pipe end portion between them, said outer sleeve integrally formed with said fitting, said inner sleeve having a plurality of longitudinal slots therein at the upper end thereof, a tapered nut disposed in the latter end of said inner sleeve, and a bolt extending through said slotted portion and said bore and threadably engaging said nut, said fitting pivotal in said recess about a single axis to a preselected angle of said top surface relative to said base, said inner sleeve expansible radially outwardly in response to tightening movement of said nut to securely grip said pipe end portion between said sleeves and fix said pipe with respect to said base, and a supporting surface.

17. In an anchoring device for pipe and the like, the connection means between a base member adapted for being secured to a supporting surface and a pipe end, comprising a fitting adapted to be rotatably disposed in a recess of said base member, said fitting having a generally centrally located bore extending through said fitting, a sleeve disposed on the top of said fitting in axial alignment with said bore and adapted to be received by a pipe end portion, said sleeve having a plurality of longitudinal slots therein at the upper end thereof and a tapered inner portion, a tapered nut partially disposed in the latter end of said sleeve, a bolt adapted to extend through a slotted portion of a base member and extending through said bore and threadably engaging said nut, said fitting pivotal in said recess about a single axis to a preselected angular relation of said top surface relative to said supporting surface, said sleeve expansible radially outwardly in response to tightening movement of said nut to securely grip said pipe end portion and fix said pipe with respect to said supporting surface.

18. In an anchoring device for pipe and the like, the connection means between a base member adapted for being secured to a supporting surface and a pipe end, comprising a fitting adapted to be rotatably disposed in a recess of said base member, said fitting having a top surface and a pair of opposed flat semicircular sides, a generally centrally located bore extending through said fitting at substantially right angles to said top surface and adapted to align with a slotted portion in said base member, an outer sleeve and an inner sleeve concentrically disposed on the top surface of said fitting in axial alignment with said bore and adapted to receive a pipe end portion between them, said outer sleeve affixed to said fitting, said inner sleeve having a plurality of longitudinal slots therein at the upper end thereof and a tapered inner portion, a tapered nut partially disposed in the latter end of said inner sleeve, a bolt adapted to extend through a slotted portion of a base member and extending through said bore and threadably engaging said nut, said fitting pivotal in said recess about a single axis to a preselected angular relation of said top surface relative to said supporting surface, said inner sleeve expansible radially outwardly in response to tightening movement of said nut to securely grip said pipe end portion between said sleeves and fix said pipe with respect to said supporting surface.

References Cited in the file of this patent
UNITED STATES PATENTS

| | | |
|---|---|---|
| 938,219 | Crumb | Oct. 26, 1909 |
| 2,626,023 | Lear | Jan. 20, 1953 |